(12) United States Patent
Patel

(10) Patent No.: US 11,394,660 B2
(45) Date of Patent: Jul. 19, 2022

(54) PROCESSING ALLOCATION IN DATA CENTER FLEETS

(71) Applicant: Google LLC, Mountain View, CA (US)

(72) Inventor: Umang Sureshbhai Patel, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 258 days.

(21) Appl. No.: 15/930,490

(22) Filed: May 13, 2020

(65) Prior Publication Data

US 2021/0359957 A1    Nov. 18, 2021

(51) Int. Cl.

| | | |
|---|---|---|
| *H04L 41/5054* | (2022.01) | |
| *H04L 47/70* | (2022.01) | |
| *H04L 47/74* | (2022.01) | |
| *H04L 47/783* | (2022.01) | |
| *H04L 47/78* | (2022.01) | |
| *G06F 9/38* | (2018.01) | |

(52) U.S. Cl.
CPC .......... *H04L 47/828* (2013.01); *H04L 47/745* (2013.01); *H04L 47/783* (2013.01); *H04L 47/788* (2013.01); *G06F 9/3877* (2013.01)

(58) Field of Classification Search
CPC ... H04L 47/828; H04L 47/745; H04L 47/783; H04L 47/788
See application file for complete search history.

(56) References Cited

U.S. PATENT DOCUMENTS

| | | | | |
|---|---|---|---|---|
| 6,539,415 | B1 * | 3/2003 | Mercs | G06F 9/5044 |
| | | | | 718/104 |
| 10,461,774 | B2 * | 10/2019 | Balle | G06F 8/65 |
| 2004/0205206 | A1 * | 10/2004 | Naik | H04L 29/06 |
| | | | | 709/230 |
| 2005/0251567 | A1 * | 11/2005 | Ballew | H04L 41/0893 |
| | | | | 709/223 |

(Continued)

OTHER PUBLICATIONS

Kirby et al. An approach to Ad hoc Cloud Computing. Feb. 5, 2010. 6 pages. Retrieved from the Internet: <http://hdl.handle.net/10023/1666>.

(Continued)

*Primary Examiner* — Abdelnabi O Musa
(74) *Attorney, Agent, or Firm* — Lerner, David, Littenberg, Krumholz & Mentlik, LLP

(57) ABSTRACT

A method and system for allocating tasks among processing devices in a data center. The method may include receiving a request to allocate a task to one or more processing devices, the request indicating a required bandwidth for performing the task, a list of predefined processing device groups connected to a host server and indicating availability of the processing device groups included therein for allocation of tasks and available bandwidth for each available processing device group, assigning the task to a processing device group having an available bandwidth greater than or equal to the required bandwidth for performing the task, and updating the list to indicate that each of the processing device group to which the task is assigned and other pro- (Continued)

cessing device group sharing at least one processing device is unavailable. The task may be assigned to an available processing device group having a lowest amount of power needed.

20 Claims, 7 Drawing Sheets

(56) References Cited

U.S. PATENT DOCUMENTS

| | | | |
|---|---|---|---|
| 2006/0106931 A1* | 5/2006 | Richoux | G06F 9/5027 709/227 |
| 2012/0159506 A1* | 6/2012 | Barham | G06F 9/5044 718/104 |
| 2018/0136985 A1* | 5/2018 | Sainath | G06F 1/3206 |

OTHER PUBLICATIONS

Extended European Search Report for European Patent Application No. 20211443.5 dated Apr. 21, 2021. 10 pages.

\* cited by examiner

PROCESSING ALLOCATION IN DATA CENTER FLEETS

BACKGROUND

A data center commonly contains a fleet of servers with various processing devices, such as graphics processing units (GPUs) and accelerators connected to the servers. The processing devices may be allocated to various tasks, such as high performance computing, cloud gaming, virtual machines, video encoding, Infrastructure-as-a-service deployment, and so on. The performance of a given task may involve processing at multiple processing devices, each being connected to the server. In addition to the server being capable of functioning as a host and communicating to the processing devices, the processing devices may also be capable of peer-to-peer communication between one another, that is, without communication being relayed through the server.

Data center server fleets can contain hundreds or even thousands of servers with varying numbers of GPUs and accelerators connected to them. As such, the bandwidth and power requirements of a server fleet can be significant. Accordingly, it is necessary to carefully manage the bandwidth and power requirements of the server fleet.

BRIEF SUMMARY

The present disclosure provides methods and system for power management of a data center server fleet, while ensuring sufficient bandwidth is provided for all tasks assigned to the server fleet. In order to provide for these benefits, information about the processing devices connected to each server of the server fleet may be obtained, and this information may be stored and accessed in order to determine to which one or more processing devices a task is assigned. Candidate groups of processing devices may be a non-exhaustive list. Altogether, the obtained information is used to narrow down a list of candidates for all received tasks, to further narrow down a list of candidates for any one given task, and to further select a single group from among the candidates to perform the task. The obtained information may be regularly updated to reflect changes in the server fleet properties. The obtained information may also be updated regularly as tasks are assigned, completed, or both.

One aspect of the present disclosure is directed to a method including receiving, by one or more processors, a first request to allocate a first task to one or more of a plurality of processing devices, each processing device connected to a corresponding host server, at least some processing devices configured to communicate with one another via a peer-to-peer connection, the first request indicating a required bandwidth for performing the first task, accessing, by the one or more processors, one or more lists of predefined processing device groups, each processing device group including one or more processing devices connected to a common corresponding host server, each list indicating availability of processing device groups of a respective server for allocation of tasks, and further indicating available bandwidth for each available processing device group, assigning, by the one or more processors, the first task to a first processing device group having an available bandwidth greater than or equal to the required bandwidth for performing the first task, and updating, by the one or more processors, the list including the first processing device group to indicate that each of the first processing device group and any other processing device group sharing at least one processing device with the first processing device group is unavailable.

In some examples, updating the list may include indicating that the first processing device group is allocated and that the any other processing device group sharing at least one processing device with the first processing device group is unavailable.

In some examples, the method may further include receiving, by the one or more processors, a second request to allocate a second task to one or more of the plurality of processing devices, the second request indicating a required bandwidth for performing the second task, accessing, by the one or more processors, one or more lists including the updated list, assigning, by the one or more processors, the second task to a second processing device group having an available bandwidth greater than or equal to the required bandwidth for performing the second task, wherein the first processing device group and the second processing device group do not share any processing devices, and re-updating, by the one or more processors, the updated list to indicate that each of the second processing device group and any other processing device group sharing at least one processing device with the second processing device group is unavailable.

In some examples, the method may further include, receiving, by the one or more processors, an indication that the first task is completed, and updating, by the one or more processors, the list including the first processing device group to indicate that the first processing device group is available, and that any other processing device group sharing at least one processing device with the first processing device group and not sharing a processing device with another allocated processing device group is available.

In some examples, updating the list may include updating the available bandwidth for one or more processing device groups sharing at least one bus connection with the first processing device group. For a given processing device group for which the available bandwidth is updated, the updated available bandwidth may be either a difference between the available bandwidth prior to the update and the required bandwidth for performing the first task, or a measured amount of available bandwidth while the first task is being performed.

In some examples, the list may include the first processing device group further indicates, for each available processing device group, an amount of additional power needed for allocating the first task to the available processing device group, and the method may further include designating an available processing group having a lowest amount of power needed as the first processing device group. Updating the list including the first processing device group may include updating the amount of additional power needed for one or more processing device groups sharing at least one hardware component or mechanical component with the first processing device group. For a given processing device group for which the amount of additional power needed is updated, the updated amount of additional power needed may be determined based on predetermined power requirements for the shared at least one hardware component or mechanical component.

In some examples, the first request may indicate each of a required host server bandwidth and a required peer-to-peer bandwidth for performing the first task. The list including the first processing device group may indicate each of an available host server bandwidth and an available peer-to-peer bandwidth for each available processing device group.

Assigning the first task to the first processing device group may be further based on an available host server bandwidth of the first processing group being greater than or equal to the required host server bandwidth for performing the first task, and an available peer-to-peer bandwidth of the first processing group being greater than or equal to the required peer-to-peer bandwidth for performing the first task.

Another aspect of the disclosure is directed to a method including receiving, by one or more processors, a request to allocate a task to one or more of a plurality of processing devices, each processing device connected to a corresponding host server, at least some processing devices configured to communicate with one another via a peer-to-peer connection, the request indicating a required bandwidth for performing the task, receiving, by the one or more processors, information for a plurality of processing device groups, each processing device group including one or more processing devices connected to a common corresponding host server, the information indicating, for each given processing device group, an available bandwidth of the given processing device group and an amount of additional power needed for activating the given processing device group, selecting, by the one of more processors, from a subset of processing device groups having an available bandwidth greater than or equal to the required bandwidth for performing the task, a processing device group having a lowest amount of additional power needed for assigning the task, and transmitting, by the one or more processors, a request to assign the task to the selected processing device group.

In some examples, the method may further include updating the information for the plurality of processing device groups based on assignment of the task to the selected processing device group. Updating the information may include updating, for each unselected group of the plurality of processing device groups, the amount of additional power needed for activating the unselected processing device group.

In some examples, the request may further indicate a group size parameter, the information may indicate, for each given processing device group, a group size of the given processing device group, and the processing device group having the lowest amount of additional power needed for assigning the task may be selected from a subset of processing device groups having an available bandwidth greater than or equal to the required bandwidth for performing the task and having a group size within the group size parameter. The group size of the given processing device group may indicate a total number of accelerators, graphical processing units, or both, included in the given processing device group.

In some examples. requesting to assign the task to the selected processing device group may include transmitting, by the one or more processors, to the host server of the selected processing device group instructions for initiating the task.

Yet another aspect of the disclosure is directed to a method including storing, by one or more processors of a server, information about a plurality of processing devices connected to and controlled by the server, wherein at least some of the plurality of processing devices are configured to communicate with one another via a peer-to-peer connection, wherein the stored information includes identifications of subgroups of the plurality of processing devices, each identified subgroup associated in the stored information with a respective indication of availability, a respective indication of available bandwidth, and a respective indication of power required for activation, receiving, by the one or more processors of the server, a request to assign a task to a specified subgroup, assigning, by the one or more processors of the server, the task to the specified subgroup, and updating, by the one or more processors of the server, the stored information to indicate changes in availability, available bandwidth, and power required for activation for at least some of the plurality of processing devices in response to the task being assigned to the specified subgroup.

The method may further include receiving, by the one or more processors of the server, a request for the stored information from a requesting node, and transmitting, by the one or more processors of the server, the stored information to the requesting node in response to the request. The request to assign the task may be received from the requesting node.

In some examples, the method may further include collecting the information about the plurality of processing devices, wherein information is collected for a non-exhaustive list of subgroups of the plurality of processing devices, wherein subgroups are excluded from the non-exhaustive list based at least in part on a quantity of processing devices included in the excluded subgroups. Storing the information about the plurality of processing devices may involve storing the compiled information. The non-exhaustive list of subgroups includes a maximum number of subgroups for each quantity of processing devices up to a predetermined maximum quantity, and the method may further include, for each subgroup of processing devices within the predetermined maximum quantity, determining a number of links connecting the processing devices of the subgroup, and for each quantity of processing devices up to the predetermined maximum quantity, selecting up to the maximum number of subgroups having a fewest number of links.

Yet a further aspect of the disclosure is directed to a system including a data center including a plurality of host servers. Each host server may be connected to a separate group of processing devices. At least some processing devices may be configured to communicate with one another via peer-to-peer connections. Each host server including grouping data identifying subgroups of the plurality of processing devices, each identified subgroup being associated with a respective indication of availability, a respective indication of available bandwidth, and a respective indication of power required for activation in the grouping data. The system may further include memory for storing instructions. The system may further include one or more processors coupled to the memory and configured to execute the stored instructions.

Executing the instructions may involve performing any of the methods described in any one or combination of the embodiments herein.

DETAILED DESCRIPTION

Overview

Figure 1:
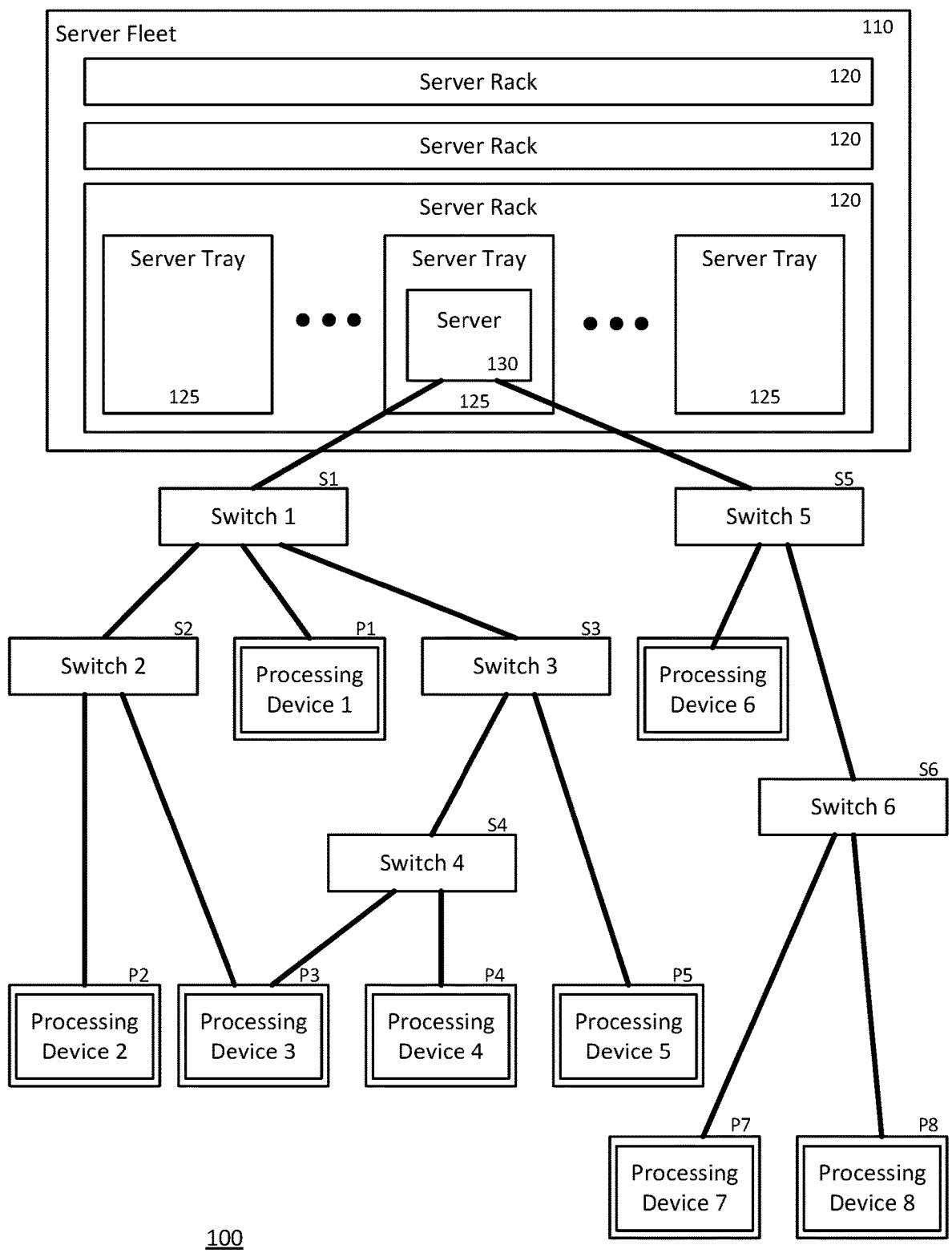
FIG. 1 is a block diagram of an example data center according to aspects of the disclosure.

The technology of the present disclosure relates generally to efficiently allocating tasks in a network of processing devices in order to optimize power requirements of the network for performing the tasks.

In order to manage the bandwidth and power requirements of the server fleet, each host may store a grouping table listing different groups of processing devices connected to the host. The grouping table may include information relating to various properties of the groups of processing devices, including but not limited to: the number of processing devices included in the group (Group Size); ID numbers of the grouped processing devices (Grouped Device(s)); the total number of links required to connect the processing devices of the group to the host (Links to Host); the total number of links required to connect the processing devices to one another via peer-to-peer connections (P2P Links); the total number of links required to connect the processing devices to the host and to one another via peer-to-peer connections (Total Links); the available bandwidth for communication between the host and processing devices of the group (Host to Device Bandwidth); the available bandwidth for communication between the processing devices via peer-to-peer connections (P2P Bandwidth); the amount of power required to activate the group (Power for Activation); and a current status or availability of the group (Status).

In some implementations, the system may receive tasks for allocation, such as from one or more users or applications. Each received task may specify a bandwidth requirement, such as a host-to-processing device bandwidth, a peer-to-peer bandwidth, or both.

In some implementations, task allocation may involve determining which groups have an available bandwidth that meets or exceeds the required bandwidth specified by the task, and then select from among those groups the group having the lowest amount of power required to activate the group. In this regard, the power expended in allocating a given incoming task is minimized while providing sufficient processing resources and communication bandwidth for the task to be completed efficiently.

In some implementations, each received task may further specify a processing device group size, such as a number of processing devices, or a minimum number of processing devices, across which the task should be allocated. In such implementations, task allocation may involve determining which groups have a group size within the task's requirements and selecting from among those groups having the specified group size.

In addition to task allocation routines and procedures, the system may also perform grouping table management procedures. Grouping table management procedures may include initially constructing and populating the grouping table. This may be performed by each host of the server fleet for its corresponding processing devices to which it is connected. A graph traversal algorithm may be used to identify links between processing devices, groups may be identified based on the links, and a limited number of groups may be selected for populating the grouping table in order to minimize the number of links for each group in the grouping table. If the network of processing devices is a tree network, then a tree traversal algorithm may be used. For a point-to-point topology, such as Peripheral Component Interconnect Express (PCIe), a breadth-first search algorithm may be used.

Grouping table management may further involve updating the grouping table of the host as tasks are allocated to the processing devices of that host. Updating the grouping table may involve indicating unavailability of processing devices as tasks are allocated to them, or unavailability of groups as tasks are allocated to the processing devices of those groups. Similarly, the processing devices or groups may be updated to indicate availability after completion of the assigned task. Updating the grouping table may further involve indicating a remaining available bandwidth for each of the groups listed as tasks are allocated to the processing devices of the network. For example, if two groups share a link in the network, then allocation of a task to one group may cause a reduction in bandwidth available over the shared link for the other group. Updating the grouping table may further involve indicating an updated power required to activate other groups of the network. For example, if two groups share a hardware component or a mechanical component, then activation of one group may reduce the power requirements for activating the second group since the hardware or mechanical component will have already been powered up and may already be operating due to activation of the first group.

The above implementations can reduce costs for assigning tasks among processing nodes, particularly for large server fleets, such as those included in data centers. The reduced costs may include any one or a combination of reduced processing power by selecting only the processing devices that are needed, reduced power consumption by using the least power possible to activate hardware and mechanical components of the data center in order to complete the task, and reduced time for completing assigned tasks by avoiding tasks being assigned to groups having insufficient resources or bandwidth.

Example Systems

FIG. 1 illustrates an example system 100 including a data center server fleet 110. Multiple server racks 120 may be included in the server fleet 120. Each server rack 120 may further include multiple server trays 125 and each server tray 125 may include a respective server 130. An example server 130 is described in greater detail in connection with FIG. 2 herein.

The data center server fleet may implement any of a number of architectures and technologies, including, but not limited to, direct attached storage (DAS), network attached storage (NAS), storage area networks (SANs), fibre channel (FC), fibre channel over Ethernet (FCoE), mixed architecture networks, or the like. The data center may include a number of other devices in addition to the processing and storage devices of the servers 130, such as cabling, routers, etc. Further, in some examples the data center may be a virtualized environment.

Each of the servers 130 included in the system may function as a host for a plurality of processing devices P1-P8, such as one or more graphics processing units (GPUs), one or more accelerators, etc. For purposes of illustration, the processing devices P1 are shown only generally, and it is not specified which device is a GPU, which device is an accelerator, and so on. The processing devices P1-P8 are connected to the server 130 and to each other via a plurality of switches S1-S6. The processing devices and switches may be arranged according to a PCIe topology, whereby the switches may be PCIe switches. In the alternative, other tree-like bus topologies may be utilized. The server fleet 120 may include hundreds if not thousands of servers, each with a varying number of processing devices connected thereto by a bus topology such as PCIe or the like.

In some examples, the topology of the server and processing devices may be a tree topology, whereby each processing device is connected to the server by a single series of one or more switches. In other examples, the topology may include additional bus links, such that a given processing device is connected to the server by more than one series of switches. For instance, in the example of FIG. 1, each of processing devices P1, P2, P4, P5, P6, P7 and P8 are connected to server 130 by a single series of switches, respectively (P1 through S1; P2 through S2, S1; P4 through S4, S3, S1; P5 through S3, S1; P6 through S5; P7 through S6, S5; and P8 through S6, S5), and processing device P3 is connected to the server by multiple series of switches (through S2, S1; or through S4, S3, S1).

Figure 2:
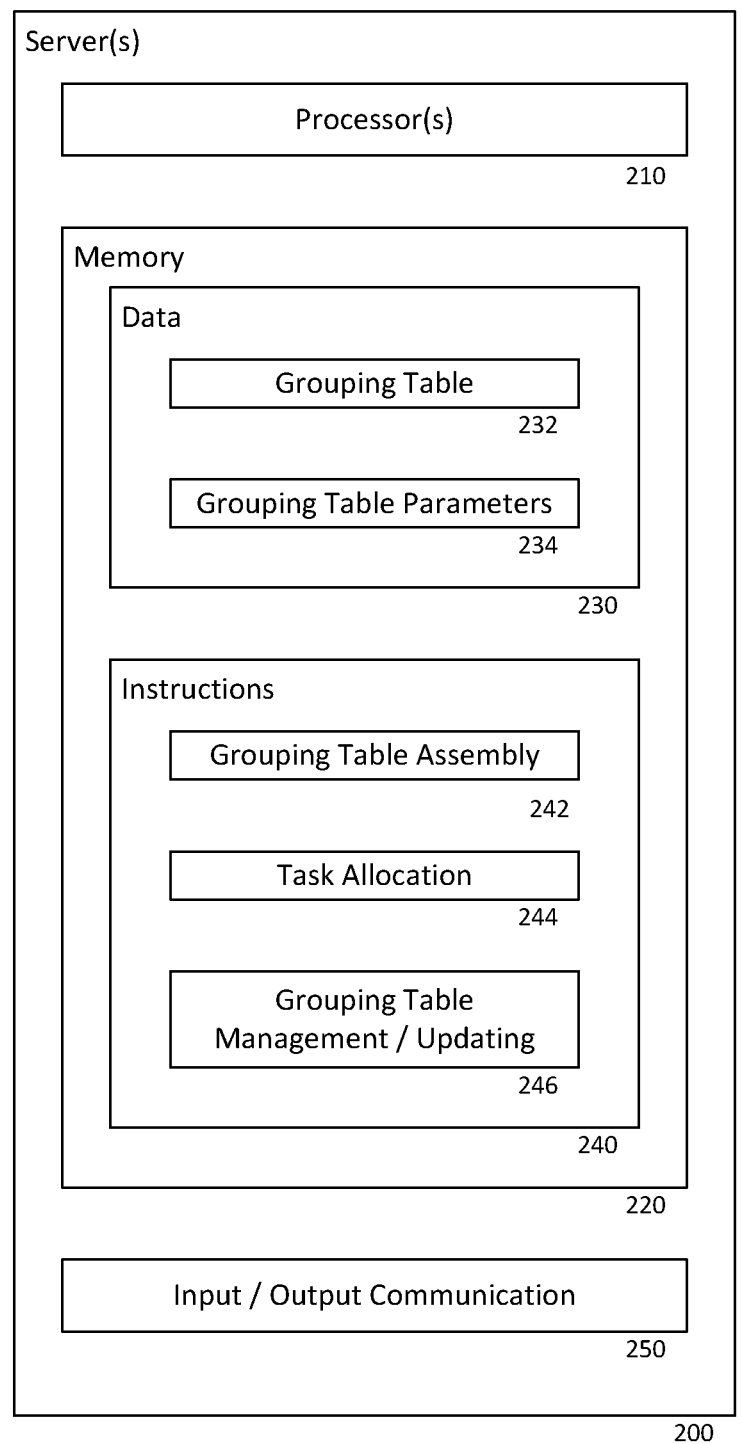
FIG. 2 is a block diagram of an example server according to aspects of the disclosure.

FIG. 2 is a block diagram of an example server 200, such as the server 130 shown in FIG. 1. The server 200 may include a processor 210, memory 220, and other components typically present in servers.

The processor 210 can be a well-known processor or other lesser-known types of processors. Alternatively, the processor 210 can be a dedicated controller such as an ASIC.

The memory 220 can store information accessible by the processor 210, including data 230 that can be retrieved, manipulated or stored by the processor 210. Memory 220 can also include instructions 240 that can be executed by the processor 210. The memory 220 may be a type of non-transitory computer readable medium capable of storing information accessible by the processor 210, such as a hard-drive, solid state drive, tape drive, optical storage, memory card, ROM, RAM, DVD, CD-ROM, write-capable, and read-only memories.

The data 230 can be retrieved, stored or modified by the processor 210 in accordance with the instructions 240. For instance, although the system and method is not limited by a particular data structure, the data 230 can be stored in computer registers, in a data store as a structure having a plurality of different fields and records, or documents, or buffers. The data 230 can also be formatted in a computer-readable format such as, but not limited to, binary values, ASCII or Unicode. Moreover, the data 230 can include information sufficient to identify relevant information, such as numbers, descriptive text, proprietary codes, pointers, references to data stored in other memories, including other network locations, or information that is used by a function to calculate relevant data.

The instructions 240 can be a set of instructions executed directly, such as machine code, or indirectly, such as scripts, by the processor 210. In this regard, the terms "instructions," "steps" and "programs" can be used interchangeably herein. The instructions 240 can be stored in object code format for direct processing by the processor 210, or other types of computer language including scripts or collections of independent source code modules that are interpreted on demand or compiled in advance.

Although FIG. 2 functionally illustrates the processor 210 and memory 220 as being within the same block, the processor 210 and memory 220 may actually include multiple processors and memories that may or may not be stored within the same physical housing. For example, some of the data 230 and instructions 240 can be stored on a removable CD-ROM and others within a read-only computer chip. Some or all of the instructions and data can be stored in a location physically remote from, yet still accessible by, the processor 210. Similarly, the processor 210 can actually include a collection of processors, which may or may not operate in parallel.

The server 200 may include a number of other devices in addition to the processor and storage devices, such as communication devices 250 to enable input and output between the computing devices, such as cabling, routers, etc. The communication devices 250 may facilitate communication between the server 200 and a user device or other remote device in communication with the data center, and may be capable of transmitting data to and from other computers such as modems (e.g., dial-up, cable or fiber optic) and wireless interfaces. For example, the server 200 and other servers and processors of the data center may receive communications via a network connection, such as through the Internet, World Wide Web, intranets, virtual private networks, wide area networks, local networks, private networks using communication protocols proprietary to one or more companies, Ethernet, WiFi (e.g., 702.71, 702.71b, g, n, or other such standards), and RPC, HTTP, and various combinations of the foregoing.

Memory 220 of each of the computing devices can store information accessible by the one or more processors 210, including data 230 that is received at or generated by the computing devices 200, and instructions 240 that can be executed by the one or more processors 210.

The data 230 may include a grouping table 232. The grouping table 232 may list a plurality of groups of processing devices, and may further indicate various properties of the processing device. For purposes of illustration, an example grouping table for groups of processing devices included in the system 100 of FIG. 1 is shown in Table 1.

TABLE 1

| Group Size | Grouped Device(s) | Links to Host | P2P Links | Total Links | Host to Device Bandwidth | P2P Bandwidth | Power for Activation | Status |
|---|---|---|---|---|---|---|---|---|
| 1 | P1 | 2 | 0 | 2 | 8 Gbps | — | 100 W | Available |
| 1 | P2 | 3 | 0 | 3 | 6 Gbps | — | 120 W | Available |
| 1 | P3 | 3 | 0 | 3 | 6 Gbps | — | 120 W | Available |
| 1 | P5 | 3 | 0 | 3 | 4 Gbps | — | 120 W | Available |
| 1 | P6 | 2 | 0 | 2 | 6 Gbps | — | 120 W | Available |
| 1 | P7 | 3 | 0 | 3 | 6 Gbps | — | 120 W | Available |
| 1 | P8 | 3 | 0 | 3 | 6 Gbps | — | 100 W | Available |
| 2 | P1, P2 | 4 | 3 | 4 | 6 Gbps | 6 Gbps | 250 W | Available |
| 2 | P1, P3 | 4 | 3 | 4 | 6 Gbps | 6 Gbps | 250 W | Available |
| 2 | P1, P5 | 4 | 3 | 4 | 4 Gbps | 4 Gbps | 250 W | Available |
| 2 | P2, P3 | 4 | 2 | 4 | 6 Gbps | 6 Gbps | 220 W | Available |
| 2 | P6, P7 | 4 | 3 | 4 | 6 Gbps | 8 Gbps | 220 W | Available |
| 2 | P6, P8 | 4 | 3 | 4 | 6 Gbps | 8 Gbps | 250 W | Available |
| 2 | P7, P8 | 4 | 2 | 4 | 6 Gbps | 8 Gbps | 250 W | Available |
| 3 | P1, P2, P3 | 5 | 4 | 5 | 6 Gbps | 6 Gbps | 450 W | Available |

TABLE 1-continued

| Group Size | Grouped Device(s) | Links to Host | P2P Links | Total Links | Host to Device Bandwidth | P2P Bandwidth | Power for Activation | Status |
|---|---|---|---|---|---|---|---|---|
| 3 | P1, P3, P4 | 6 | 5 | 6 | 6 Gbps | 6 Gbps | 450 W | Available |
| 3 | P1, P4, P5 | 6 | 5 | 6 | 4 Gbps | 4 Gbps | 450 W | Available |
| 3 | P1, P2, P5 | 6 | 5 | 6 | 4 Gbps | 4 Gbps | 450 W | Available |
| 3 | P2, P3, P5 | 6 | 5 | 6 | 4 Gbps | 4 Gbps | 450 W | Available |
| 3 | P3, P4, P5 | 6 | 4 | 6 | 4 Gbps | 4 Gbps | 420 W | Available |
| 3 | P6, P7, P8 | 5 | 4 | 5 | 6 Gbps | 8 Gbps | 440 W | Available |

In the example of Table 1, the grouping table includes seven groups of processing devices having a group size of 1, seven groups of processing devices having a group size of 2, and seven groups of processing devices having a group size of 3. The group size of each group corresponds to the total number of processing devices included in the group.

In some examples, the groups included in the grouping table may not be an exhaustive list of all groups. For instance, the number of groups listed for each given group size may be limited by a predetermined value. The predetermined value may be one of the grouping table parameters 234 stored in the memory and used to control population of the grouping table 232. For instance, server 130 of system 100 of FIG. 1 is connected to eight processing devices P1-P8, but the grouping table for server 130 may be limited to seven groups. In such an example, such as is shown in Table 1, one of the processing devices may be excluded from the groups of group size 1.

A determination as to which processing device to exclude may be based on predefined rules also included in the grouping table parameters 234. For example, the parameters may specify one or more rules by which certain candidate groups are prioritized over other candidate groups based on one or more properties of the respective groups. Such properties may include, but are not limited to, the various group properties shown in Table 1, which include the total number of links required to connect the processing devices of the group to the host (Links to Host), the total number of links required to connect the processing devices to one another via peer-to-peer connections (P2P Links), the total number of links required to connect the processing devices to the host and to one another via peer-to-peer connections (Total Links), the available bandwidth for communication between the host and processing devices of the group (Host to Device Bandwidth), the available bandwidth for communication between the processing devices via peer-to-peer connections (P2P Bandwidth), and the amount of power required to activate the group (Power for Activation). Since population of the grouping table would occur before allocating tasks to any of the processing devices, the current status or availability of each group (Status) would not be a factor for selecting candidate groups, as each group would necessarily begin "Available."

In the example of Table 1, Total Links are used to select candidate groups, whereby groups having fewer Total Links are preferred over groups having more Total Links. In the example of Group Size 1, P4 is excluded since it is the only processing device to have 4 total links, whereas each of the other processing devices has 3 or fewer total links.

In the example of Group Size 2, only processing device pairs having 4 total links or fewer are included in the grouping table. For example, the Group P1, P5 is included because the processing devices P1 and P5 are linked to the server 130 and to each other by no more than 4 links: P1-S1, P5-S3, S3-S1, and S1-server. By comparison, Group P2, P5 is excluded because at least 5 links are required to link the processing devices P2 and P5 to each other and to the server 130: P2-S2, S2-S1, P5-S3, S3-S1, and S1-server.

In the example of Group Size 3, only processing device groups having 6 total links or fewer are included in the grouping table. For example, the Group P1, P2, P5 is included because the processing devices P1, P2 and P5 are linked to the server 130 and to each other by no more than 6 links: P1-S1, P2-S2, S2-S1, P5-S3, S3-S1, and S1-server. By comparison, Group P2, P3, P4 is excluded because at least 7 links are required to link the processing devices P2, P3 and P4 to each other and to the server 130: P2-S2, S2-S1, P3-S2 (or P3-S4), P4-S4, S4-S3, S3-S1 and S1-server.

In some cases, two processing groups may have the same properties for determining which group to including in a grouping table, but the grouping table may be limited such that only one group can be selected. In such a case, a group may be selected either at random, or according to a secondary rule. For example, with Group Size 3 of Table 1, the Group P1, P3, P5 is not included in the grouping table, although P1, P3 and P5 are linked to the server 130 and to each other by no more than 6 links: P1-S1, P3-S2, S2-S1, P5-S3, S3-S1, and S1-server. Selection of the other candidates over P1, P3, P5 may have been at random. Alternatively, additional factors may have been taken into account in excluding this group in favor of the other groups.

Similar determinations may be made for each grouping size, whereby those processing device groups of the given grouping size having the fewest Total Links (or the best of some other property in a different example) be selected for inclusion in the grouping table 232.

Returning to FIG. 2, in some examples, the grouping table parameters 234 may further include a group size threshold value indicating a maximum group size, minimum group size, or both. In the example of the grouping table of Table 1, the grouping table includes processing device groups having group sizes of 1, 2 and 3, although other processing device groups of larger group sizes (e.g., 4, 5) are available. This may be due to a grouping table parameter limiting the grouping table to a group size of 3. For further example, since the grouping table of Table 1 includes groups having group size 1, it can be seen that the grouping table does not have a minimum group size.

The instructions 240 may include various algorithms for instructing the processor 210 to execute operations in accordance with the routines described herein. For example, the instructions 240 may include a grouping table assembly routine 242 for populating a grouping table, such as according to the example rules demonstrated above. For further example, the instructions may include a task allocation routine 244 for determining to which processing device groups an incoming task should be assigned. For further example, the instructions 240 may include a grouping table management or updating routine for updating properties of the processing device groups included in the grouping table.

These routines and others are described in greater detail in connection with the flow diagrams of FIGS. 3-7. It should be understood that the routines described herein are merely examples, and in other examples, certain steps may be added, subtracted, replaced or reordered.

Example Methods

Figure 3:
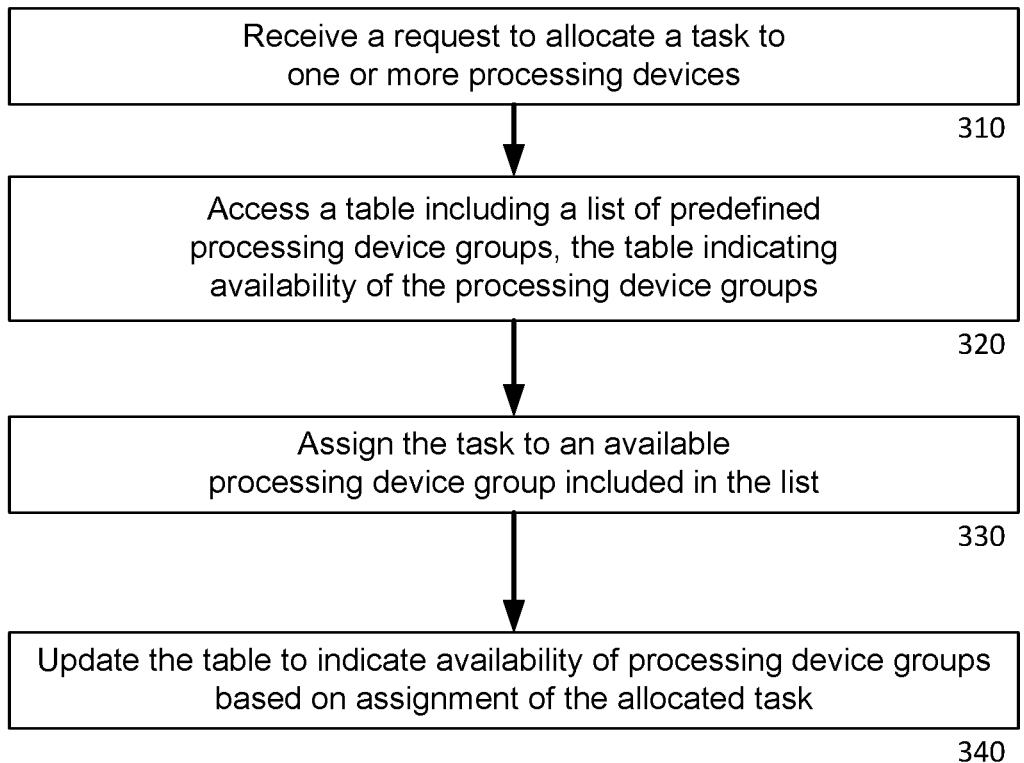
FIG. 3 is a flow diagram representing an example task allocation routine according to aspects of the disclosure.

FIG. 3 is a flow diagram illustrating an example routine 300 for allocating tasks received at the data center. The routine may be performed by one or more processors of a task allocator included in the data center. In the example of FIG. 2, the data and instructions of the task allocator are shown as being included in a server of the data center. However, in other examples of the disclosure, the task allocator may include one or more processors and one or more memory storage devices separate from the servers of the data center, or may include some combination of server processors and memory and separate processors and memory.

At block 310, the one or more processors may receive a request to allocate a task to one or more processing devices of the data center. The request may be received from a user device or other remote device in communication with the data center and capable of transmitting data to and from other computers.

The received request may include instructions for carrying out processing operations associated with the task. In some examples, the received request may further include an indication of an amount of bandwidth required to perform the task. In some examples, the received request may further include an indication of a number of processing devices required to performed the task. Since not all processing devices included in the data center may necessarily have sufficient bandwidth to perform the task, and not all groups of processing devices included in the data center may necessarily include the required number of devices, this information can be used by the one or more processors to determine candidate processing device groups for performing the task, and more particularly, to exclude processing device groups that do not meet the above stated criteria for performing the task.

At block 320, the one or more processors may access a list of predefined processor groups. The list may be stored in and accessed from a server included in the data center. In some examples, each server included in the data center may store a separate list including the processing devices connected to that server. As such, the processing devices connected to the servers of the data center may be included in a plurality of separately stored lists. In such examples, block 320 may involve accessing a list from each of the servers of the data center, or more particularly, from each of the servers including a list. The one or more processors may be configured to aggregate the accessed lists in order to process information related to all of the processing devices connected to the data center servers. For purposes of clarity, the examples below refer to a "list," but it should be understood that the same or similar principles may be applied to multiple lists accessed and evaluated by the one or more processors.

In some examples, the list may be stored in the form of a table, although the list may be stored in another structure instead. The list may include the information shown in Table 1 shown above in connection with FIG. 2. That is, the list may include, for each of the processing device groups, any one or combination of the following properties:

Group Size: the number of processing devices included in the group.

Grouped Device(s): ID numbers of the processing devices included in the group.

Links to Host: a total number of links used to connect the processing devices included in the group to the connected server.

P2P Links: a total number of links used to connect the processing devices included in the group to one another via peer-to-peer connections.

Total Links: a total number of links used to connect the processing devices included in the group to the connected server and to each other. In many cases, two processing devices included in a group may share one or more links in connect to the server, or a link connecting one processing device to another may also be link connecting one of the processing devices to the server. In such cases, the Total Links may be less than the sum of the values for Links to Host and P2P Links.

Host to Device Bandwidth: an available bandwidth for communication between the connected server and the processing devices included in the group. In some cases, the available bandwidth in the links connecting the server to one processing device may be different than the available bandwidth for connecting to a different processing device. In such a case, the value listed here is the lowest value among all of the processing devices included in the group, since assigning a task to the group would be limited by the processing device having the lowest available bandwidth.

P2P Bandwidth: an available bandwidth for communication between the processing devices included in the group via the peer-to-peer connections. As with Host to Device Bandwidth, the available bandwidth in the links connecting one processing device to another processing device may be different from one peer-to-peer connection to the next. In such a case, the value listed here is the lowest value among all of the peer-to-peer connections of processing devices included in the group, since assigning a task to the group would be limited by the peer-to-peer connection having the lowest available bandwidth. Available bandwidth may vary as tasks are assigned to or completed by the processing devices connected to the server, using up available bandwidth and leaving less available bandwidth for future tasks.

Power for Activation: an amount of power required to activate the processing devices included in the group if the task were to be assigned to the group. In some examples, power may be needed to operate hardware components of the processing devices of the group, such as to power application-specific integrated circuits (ASICs), GPUs, trays and processor boards. In some examples, power may be needed to operate mechanical components associated with the processing devices of the groups, such as to power a server fan or cooling devices for maintaining a temperature of the server fleet.

Status: a current status or availability of the group of processing device. The Status may indicate when the group is available or unavailable to be assigned a task. The Status may further differentiate between groups that are unavailable because a task has been assigned to the group, and groups that are unavailable because one or more processing devices included in the group are also included in a different group to which a task was assigned.

At block 330, the one or more processors may assign the task to a group of processing devices included in the group. In some examples, assigning the task may involve first identifying candidate groups from the list according to a first set of criteria, and subsequently selecting one of the candidate groups from the list according to a second set of criteria. The first criteria may filter out groups of processing devices to which the task cannot be assigned, such as groups having an insufficient number of processing devices to perform the task, or having insufficient bandwidth to perform the task. Insufficient bandwidth may refer to insufficient bandwidth between the server and each of the processing devices, to insufficient bandwidth in peer-to-peer connections between the processing devices, or a combination of the two. The first criteria may also be used to filter out groups of processing devices that are unavailable, either due to another task having already been assigned to the group, or due to at least one of the processing devices included in the group being included in a different group to which a different task was assigned and is not yet completed. The second criteria may be used to select a best group from among the candidate groups, based on such factors as lowest or highest available bandwidth, lowest required power, lowest or highest number of processing devices, and so on.

Figure 4:
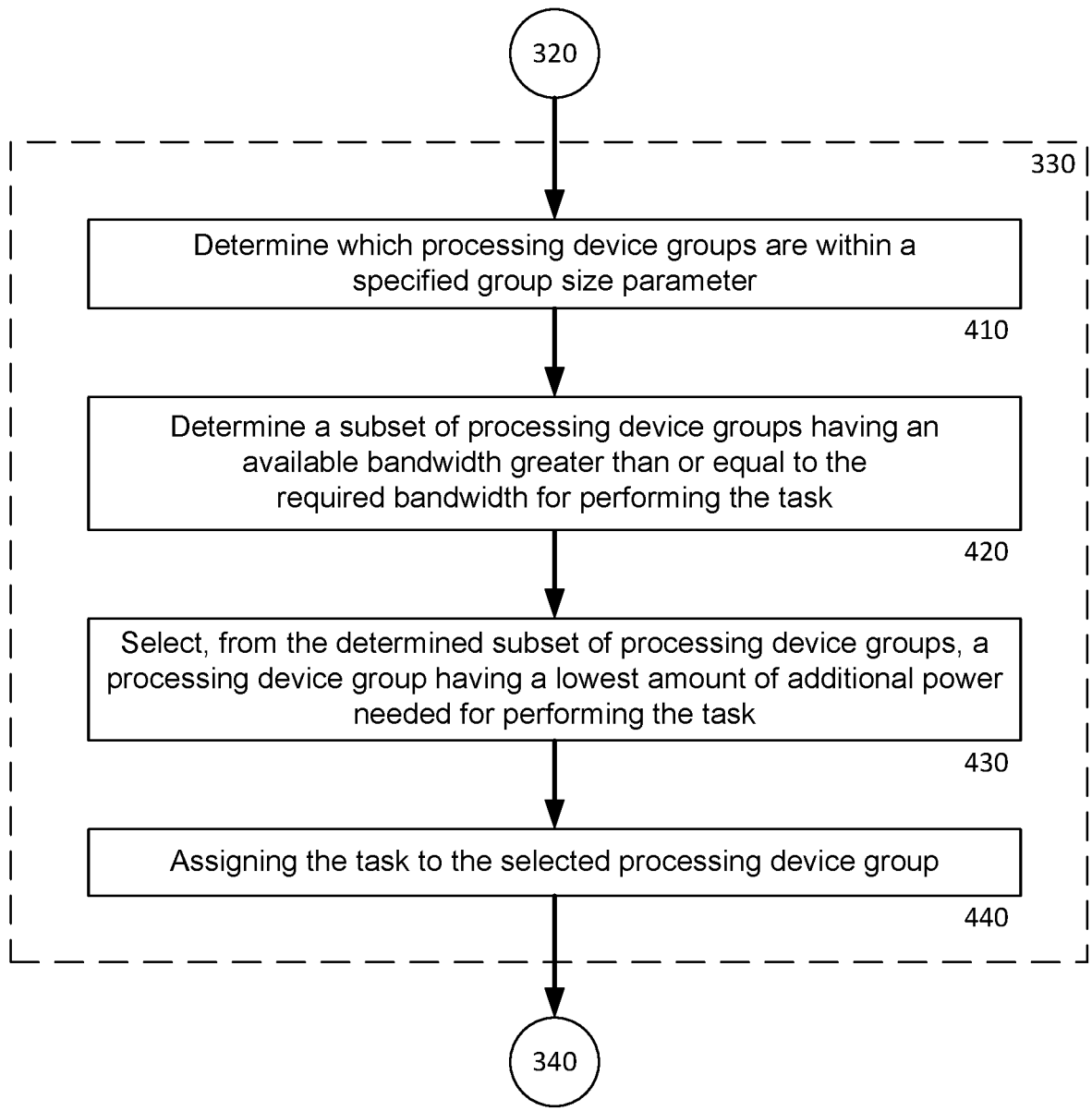
FIGS. 4-6 are flow diagrams of example subroutines of the task allocation routine of FIG. 3, according to aspects of the disclosure.

FIG. 4 is a flow diagram illustrating an example subroutine 400 for block 330 of FIG. 3, assigning a task to a group of processing devices. Operations of routine 300 may proceed from block 320 to continue with the operations of block 410 in FIG. 4. An example of the subroutine 400 will be described in connection with the system 100 shown in FIG. 1 and the system properties shown in Table 1. In the example, a received task requires a group size of at least 2 processing devices, a host-to-device bandwidth of 5 Gbps, and a peer-to-peer bandwidth of 2 Gbps.

At block 410, the one or more processors may determine which processor groups are within a specified group size parameter. For example, the one or more processors may exclude the first seven processor device groups of Table 1, as the received task requires a group size of at least 2 processing devices, and each of those groups includes only one processing device.

At block 420, the one or more processors may determine which groups of processing devices have an available bandwidth greater than or equal to the required bandwidth for performing the task. Continuing with the above example, the one or more processors may exclude groups (P1, P5), (P1, P4, P5), (P1, P2, P5), (P2, P3, P5) and (P3, P4, P5) for having insufficient host-to-device bandwidth. The remaining group of processing devices make up a subset of the list of processing devices, the subset itself being a list of candidate processing device groups to which the task may be assigned.

At block 430, the one or more processors may select, from the subset of processing device groups, a processing device group having a lowest amount of additional power needed for performing the task. Continuing with the above example, the one or more processors may select either (P2, P3) or (P6, P7) from the list, since each of those groups requires 220 W of additional power in order to perform the task, whereas the other groups require more than 220 W. The selection between these two groups may be at random, or may be based on further criteria, such as which group has the higher available bandwidth, etc. The result of selecting one of these two groups is that the power expended in performing the task is reduced, compared to the power expended by a group assigned using other known processes. Over time, the resulting power savings from task allocations such as the one described above can amount to up to several kWh per day.

At block 440, the one or more processors assign the task to the selected group of processing devices. Assigning the task may involve providing the task to the server connected to the group of processing devices, and providing instructions to the server to perform the task, including specifying the processing devices to be used for performing the task.

Returning to FIG. 3, after the task has been assigned, operations may continue at block 340, with the one or more processors updating the list. In some examples, updating the list may involve updating the indication of availability for the processor groups included in the list. In other examples, other properties included in the list may also be updated, such as "Bandwidth" and "Power for Activation" parameters.

Figure 5:
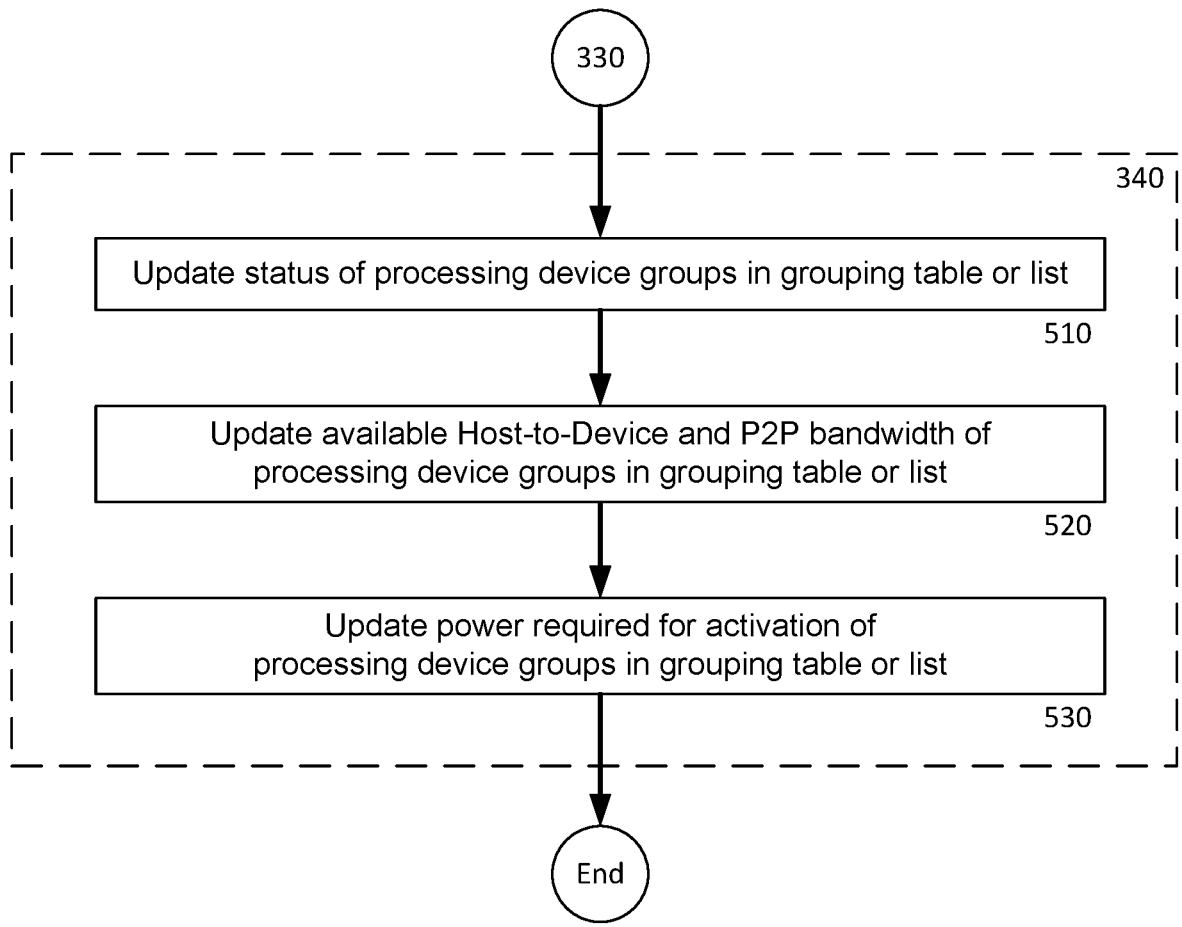

FIG. 5 is a flow diagram illustrating an example subroutine 500 for block 340 of FIG. 3, updating the list of processing device groups. Operations of routine 300 may proceed from block 330 to continue with the operations of block 510 in FIG. 5. The example provided above in connection with FIGS. 3 and 4 is continued here to further illustrate operation of the system.

At block 510, the one or more processors may update the status of the processor device groups included in the list. Additionally, the Status of other groups including either the P2 processing device or the P3 processing device may be updated to "Unavailable," meaning the group is not available to be assigned a task since at least some of its processing devices are occupied with another task.

Figure 6:
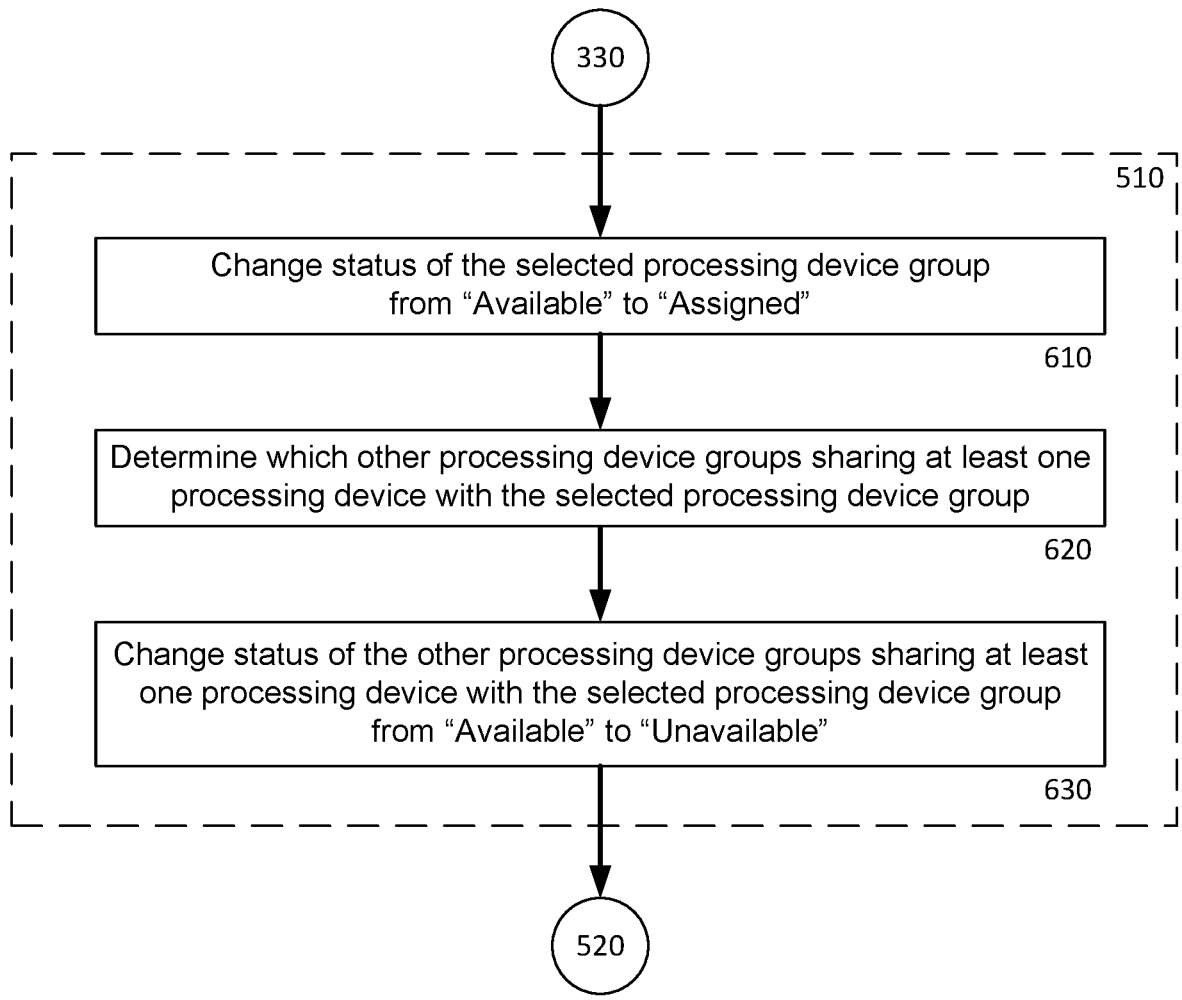

FIG. 6 is a flow diagram illustrating an example subroutine 600 for block 510 of FIG. 5, updating processor device group statuses in the list. At block 610, the one or more processors may change the status of the selected processing device group from "Available" to "Assigned." Continuing with the above example, assuming that the task is assigned to group (P2, P3), the Status of group (P2, P3) may be updated from "Available" to "Assigned," meaning the group has been assigned a task and cannot be assigned another task. In other examples, the status may be changed to "Unavailable," meaning the group is not available to be assigned a task. The "Unavailable" status may be more general than "Assigned," as it indicates which groups are unavailable but does not indicate to which groups tasks have been allocated.

At block 620, the one or more processors may determine which other processing device groups (that is, other than the processing device group assigned the task at block 330) share at least one processing device with the selected processing device group. Continuing with the above example, since processing devices P2 and P3 are included in group (P2, P3), the other groups included in this determination would include (P2), (P3), (P1, P2), (P1, P3), (P1, P2, P3), (P1, P3, P4), (P1, P2, P5), (P2, P3, P5) and (P3, P4, P5). It should be noted that the determination of block 620 applies not only to the subset of candidate processing device groups, but to all processing device groups included in the list.

At block 630, the one or more processors may change the status of the processing device groups determined at block 620 to share at least one processing device with the selected processing device group. The status may be changed from "Available" to "Unavailable," indicating that at least one processing device included in each group is unavailable for other tasks to be assigned.

Returning to FIG. 5, at block 520, the one or more processors may update the "Bandwidth" properties of the processing device groups included in the list based on the assignment of the task. Continuing with the above example, assuming that the task is assigned to group (P2, P3), this may decrease the available bandwidth of the links between the server 130 and the processing devices P2 and P3, which as shown in FIG. 1 are links P2-S2, P3-S2, S2-S1 and S1-server. As a result, other processing devices that rely on one or more of these links to connect to the server or to connect to other processing devices via peer-to-peer links have less bandwidth available remaining to them after assignment of the task.

In some examples, updating "Bandwidth" properties may be accomplished by monitoring. For example, available bandwidth may be derived based on actual link utilization monitoring. Monitoring functions may be executed and controlled by the one or more processors of the task allocator, of the data center servers, or some combination thereof.

In some examples, updating "Bandwidth" properties may be accomplished by estimation. For example, the amount of bandwidth required by a task can be subtracted from the amount of bandwidth available in the group to which the task is assigned in order to derive an updated amount of bandwidth available. Continuing with the above example, since the host-to-device bandwidth needed for the task is 5 Gbps and the P2P bandwidth needed is 2 Gbps, these values may be subtracted from the available bandwidth of the assigned group (P2, P3). Additionally, other groups sharing a link with the assigned group could be estimated to have a similar drop in available bandwidth. Again, continuing with the above example, bandwidth may be estimated to drop by 5 Gbps for groups including the link S1-server, which are all groups including P1, P2, P3, P4 or P5, while bandwidth may remain the same for P6, P7 and P8.

It should be noted that, in some instances, the allocation of a task to a group of processing devices may affect bandwidth for other groups even if those groups do not share a processing device with the assigned group. For instance, as noted above for group (P2, P3), the allocation of a task to this group may affect bandwidth of other groups sharing the S1-server link. In a similar fashion, allocation of a task to the group (P1, P5) may reduce bandwidth over the link S3-S1, which is also used for processing device group (P3, P4), despite that group not sharing any processing devices with group (P1, P5).

Furthermore, measurement and estimation techniques are not mutually exclusive of one another, as some systems may rely on regular estimations and periodic corrections to the estimations based on measurements.

At block 530, the one or more processors may update the "Power for Activation" property of processing device groups included in the list. Activating a processing device group may involve activating hardware or mechanical components that were previously inactive, idle, or in a low power state. The hardware components could include any one or combination of ASICs, GPUs, trays or boards of the processing devices included in the assigned processing device group. The mechanical components could include any one or combination of server fans or cooling devices of the processing devices included in the assigned processing device group. Other hardware or mechanical components may also be included. Since a given hardware component or a given mechanical component may service more than one processing device, activating the hardware or mechanical component to service one processing device may mean that the component is already activated and does not need to be activated again for servicing a second processing device, such as a device included in a different processing device group. As such, the activation of hardware and mechanical components for the purpose of activating one processing device group may result in less power being needed to activate hardware and mechanical components of another processing device group, since the some components may have already been activated.

Continuing with the above example from Table 1, the selected processing device group (P2, P3) required 220 W to be activated. Since all of the hardware and mechanical components are activated upon assignment of the task, the power required for activation may drop to 0 W. Additionally, for other processing device groups, such as those sharing processing device P2 or P3, the power required for those groups may also drop since the mechanical and hardware components of those processing devices are already activated. Additionally, other processing devices may share hardware or mechanical components with P2 or P3, so activation of processing device groups including those processing devices may also be reduced. For instance, if P1 and P2 were to share a hardware component, and if P3, P5 and P7 were all to share a mechanical component, then required power for activation may drop for all processing device groups including one of P1, P5 or P7, even though none of those processing devices are currently assigned a task.

To illustrate an example of one or more processors updating properties of processing device groups after allocation of a task to one of the processing device groups, an updated grouping table for groups of processing devices included in the system 100 of FIG. 1 is shown in Table 2:

TABLE 2

| Group Size | Grouped Device(s) | Links to Host | P2P Links | Total Links | Host to Device Bandwidth | P2P Bandwidth | Power for Activation | Status |
|---|---|---|---|---|---|---|---|---|
| 1 | P1 | 2 | 0 | 2 | 4 Gbps | — | 100 W | Available |
| 1 | P2 | 3 | 0 | 3 | 1 Gbps | — | 0 W | Unavailable |
| 1 | P3 | 3 | 0 | 3 | 1 Gbps | — | 0 W | Unavailable |
| 1 | P5 | 3 | 0 | 3 | 4 Gbps | — | 120 W | Available |
| 1 | P6 | 2 | 0 | 2 | 6 Gbps | — | 120 W | Available |
| 1 | P7 | 3 | 0 | 3 | 6 Gbps | — | 120 W | Available |
| 1 | P8 | 3 | 0 | 3 | 6 Gbps | — | 100 W | Available |
| 2 | P1, P2 | 4 | 3 | 4 | 1 Gbps | 4 Gbps | 130 W | Unavailable |
| 2 | P1, P3 | 4 | 3 | 4 | 1 Gbps | 1 Gbps | 130 W | Unavailable |
| 2 | P1, P5 | 4 | 3 | 4 | 4 Gbps | 4 Gbps | 250 W | Available |
| 2 | P2, P3 | 4 | 2 | 4 | 1 Gbps | 4 Gbps | 0 W | Assigned |
| 2 | P6, P7 | 4 | 3 | 4 | 6 Gbps | 8 Gbps | 220 W | Available |
| 2 | P6, P8 | 4 | 3 | 4 | 6 Gbps | 8 Gbps | 250 W | Available |
| 2 | P7, P8 | 4 | 2 | 4 | 6 Gbps | 8 Gbps | 250 W | Available |
| 3 | P1, P2, P3 | 5 | 4 | 5 | 1 Gbps | 4 Gbps | 230 W | Unavailable |
| 3 | P1, P3, P4 | 6 | 5 | 6 | 1 Gbps | 1 Gbps | 330 W | Unavailable |
| 3 | P1, P4, P5 | 6 | 5 | 6 | 4 Gbps | 4 Gbps | 450 W | Available |
| 3 | P1, P2, P5 | 6 | 5 | 6 | 1 Gbps | 1 Gbps | 330 W | Unavailable |
| 3 | P2, P3, P5 | 6 | 5 | 6 | 1 Gbps | 1 Gbps | 230 W | Unavailable |
| 3 | P3, P4, P5 | 6 | 4 | 6 | 1 Gbps | 4 Gbps | 300 W | Unavailable |
| 3 | P6, P7, P8 | 5 | 4 | 5 | 6 Gbps | 8 Gbps | 440 W | Available |

In the example of Table 2, the Bandwidth, Power for Activation, and Status properties for many processing device groups are updated to reflect: the reduction in available bandwidth due to the first task having been assigned; the reduction in power needed for activation of other processing device groups due to components of the (P2, P3) group having already been activated; and the unavailability of some processing groups due to processing devices P2 and P3 being in use.

Although not shown in FIG. 3, upon completion of the task, the one or more processors may further update the properties of the processing device groups again to reflect the availability of the processing devices P2 and P3, and that processing device group (P2, P3) is no longer assigned a task. This may involve the properties shown in Table 2 reverting to those shown in Table 1, provided that another task has not been assigned to any of the other processing devices in the meanwhile.

In another scenario, another task may be received by the one or more processors to be assigned before the first task is completed. In such a case, the one or more processors may rely on the properties shown in Table 2 in order to efficiently assign the next task to a processing device group that still has sufficient available bandwidth and for which a least amount of power is required to activate the processing devices in view of the first task already causing some hardware and mechanical components to be active.

Continuing with the above example for the sake of illustration, if the second received task requires a group size of 3 or more, 1 Gbps of Host-to-Device Bandwidth, and 1 Gbps of P2P Bandwidth, then the one or more processors may determine a subset of candidate processing device groups excluding all groups having a group size of 1 or 2, as well as (P1, P2, P3), (P1, P3, P4), (P1, P2, P5), (P2, P3, P5) and (P3, P4, P5) as "Unavailable." This would leave two candidate processing device groups: (P1, P2, P5) and (P6, P7, P8). The one or more processor may then assign the task to (P6, P7, P8) on the basis that the power required for activation of that group is 440 W, which is lower than the power required for activation of (P1, P4, P5). The one or more processors may then further update the properties of the processing device groups to reflect that (P6, P7, P8) is assigned a task, that the other groups including at least one of P6, P7 or P8 is Unavailable, reduced available bandwidth for at least some other processing device groups, and less power being required for activation of at least some other processing device groups.

Figure 7:
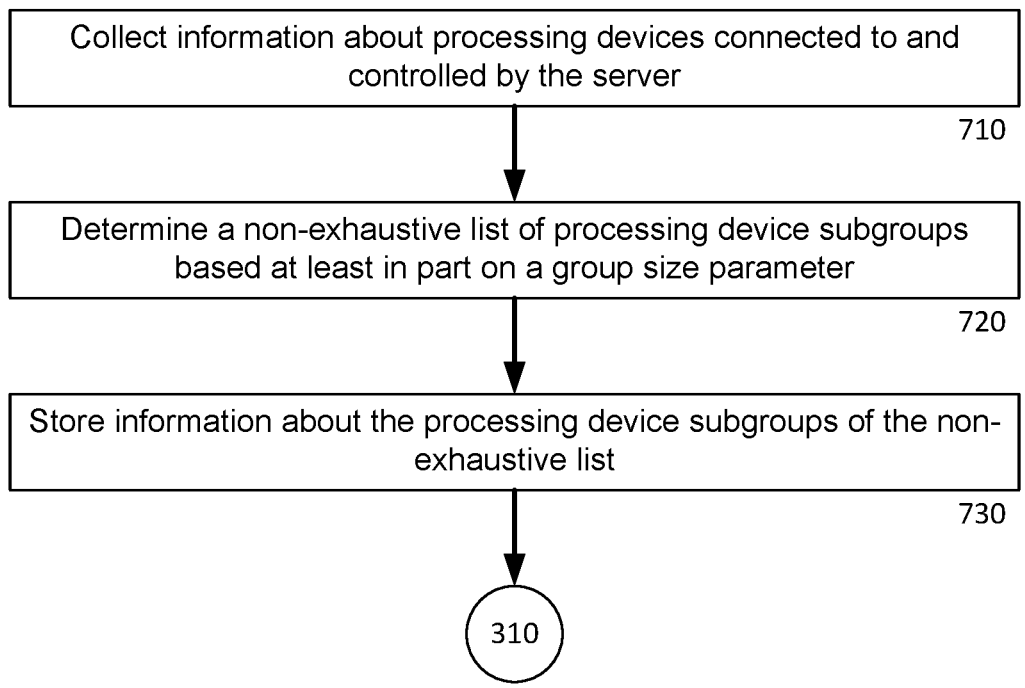
FIG. 7 is a flow diagram of an example information collection and storage routine according to aspects of the disclosure.

In some examples, the one or more processors may also be configured to populate the list of processing device groups and their properties, whether in the form of a table or in some other form or data structure, priori to a first task being received. FIG. 7 is a flow diagram illustrating an example routine 700 for collecting and storing information about the one or more processing device groups connected to the server. The steps of routine 700 may be performed, entirely or at least partially, prior to block 310 of FIG. 3.

At block 710, the one or more processors may collect information about the processing devices connected to and controlled by the server. The information may include data about connections between processing devices connected to the server, such as which devices are peer-to-peer connected, over which links, and through which switches. Although not shown in the above examples for sake of simplicity, the information included in the lists may further include the particular links used to connect the server, processing devices and switches to one another. This information may be gathered using one or more traversal algorithms, such as a tree traversal algorithm, or more particularly such as a breadth-first search algorithm. The collected information from the traversal algorithm may be used to determine total numbers of links connecting various groups of processing devices. The information may also include measurements of bandwidth between the server and the respective processing devices, measurements between respective processing devices via peer-to-peer connections, measurements of power used to activate the hardware and mechanical components associated with the respective devices, and so on.

At block 720, the one or more processors may determine a non-exhaustive list of processing device subgroups. As stated previously, the non-exhaustive list may be limited based on predetermined values, such as a group size parameter, which limits the group size of any given subgroup of processing devices. For instance, in the above example of Tables 1 and 2, the non-exhaustive list represented by those tables included two limitations: a group size limit of 3, that is, no more than three processing devices in a subgroup, and a limit of seven subgroups for each group size. In other examples, a different parameter may be selected. For instance, the number of subgroups for each group size may be limited by the total number of processing devices connected to the server, whereby groups having a group size of 1 would not be limited. In such an example, Table 1 and Table 2 would include 24 entries: 8 groups of size 1; 8 groups of size 2; and 8 groups of size 3.

The selection of subgroups to be included in the non-exhaustive list may be based on additional factors and parameters, such as a total number of links included in each group. In the example of Table 1 and Table 2, the subgroups were selected to minimize the total number of links, such that subgroups having more total links were excluded from the list in favor of subgroups having fewer total links. In other examples, other factors, such as bandwidth, may be taken into account. In some instances, the exclusion of subgroups from the list may be influenced by the inclusion of other subgroups, such as if each processing device is limited to appearing in the list a maximum number of times.

At block 730, the information about the subgroups included in the non-exhaustive list is stored. For example, each list may be stored at the respective server connected to the processing devices included in that list.

In the example of FIG. 7, the routine is carried out prior to operations of FIG. 3. However, in some instances, the operations of FIG. 7 may be performed at a later time. For instance, the one or more processors may periodically monitor all bus links connected to the server and update the information included in the list based on the new measurements. In this respect, available bandwidth for some processing device groups may change based on the updated collected information.

In some examples, the operations of routines 300 and 700 may be carried out by separate processors. For example, one or more processors of the server connected to the processing devices included in the list may be responsible for performing the operations of routine 700, since these operations are limited to collecting information from devices connected to the particular server, whereas one or more processors of a task allocator connected to many servers of the system may be responsible for performing the operations of routine 300, since when a task is received, lists from the several servers may be queried in order to find an optimal or most efficient processing device group for allocating the task.

In this respect, it should be recognized that the examples described above in connection with FIGS. 3-6 generally describe a simplified example of assigning a task to the processing devices associated with a single server based on a single list and updating the single list once the task has been allocated, and FIG. 7 generally describes a simplified example of populating a single grouping table for a single server. However, in other examples, many servers may include respective lists of processing device groups, and the one or more processors of the job allocator may collect information from all or a plurality of these lists and allocate the task based on information from the multiple lists.

The systems and routines described above can reduce costs for assigning tasks among processing nodes connected to a single server, or more particularly among processing nodes connected to many respective servers of a server fleet. This can be especially beneficial for large server fleets, such as those included in data centers, where improvements in energy efficiency can have large scale effects on reducing costs and avoiding technical problems such as outages. The reduced costs may be a result of reduced power expended by selecting only the processing devices that are needed, and further by selecting groups of processing devices that are not already occupied but for which many hardware and mechanical components are already in use and do not need to be activated or taken out of an idle or power saving state. Additionally, the present disclosure also provides for reduced time for completing assigned tasks since the systems and routines are configured to track and regularly update available bandwidth of processing devices and processing device group, and further since the systems and routines are configured to track availability of the groups and to assign tasks to groups that are available instead of queuing the tasks with a group that will later be available.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
receiving, by one or more processors, a first request to allocate a first task to one or more of a plurality of processing devices, each processing device connected to a corresponding host server, at least some processing devices configured to communicate with one another via a peer-to-peer connection, the first request indicating a required bandwidth for performing the first task;
accessing, by the one or more processors, one or more lists of predefined processing device groups, each processing device group including one or more processing devices connected to a common corresponding host server, each list indicating availability of processing device groups of a respective server for allocation of tasks, and further indicating available bandwidth for each available processing device group;
assigning, by the one or more processors, the first task to a first processing device group having an available bandwidth greater than or equal to the required bandwidth for performing the first task; and
updating, by the one or more processors, the list including the first processing device group to indicate that each of the first processing device group and any other processing device group sharing at least one processing device with the first processing device group is unavailable.

2. The method of claim 1, wherein updating the list includes indicating that the first processing device group is allocated and that the any other processing device group sharing at least one processing device with the first processing device group is unavailable.

3. The method of claim 2, the method further comprising:
receiving, by the one or more processors, a second request to allocate a second task to one or more of the plurality of processing devices, the second request indicating a required bandwidth for performing the second task;
accessing, by the one or more processors, one or more lists including the updated list;
assigning, by the one or more processors, the second task to a second processing device group having an available bandwidth greater than or equal to the required bandwidth for performing the second task, wherein the first processing device group and the second processing device group do not share any processing devices; and
re-updating, by the one or more processors, the updated list to indicate that each of the second processing device group and any other processing device group sharing at least one processing device with the second processing device group is unavailable.

4. The method of claim 2, the method further comprising:
receiving, by the one or more processors, an indication that the first task is completed; and
updating, by the one or more processors, the list including the first processing device group to indicate that the first processing device group is available, and that any other processing device group sharing at least one processing device with the first processing device group and not sharing a processing device with another allocated processing device group is available.

5. The method of claim 1, wherein updating the list includes updating the available bandwidth for one or more processing device groups sharing at least one bus connection with the first processing device group.

6. The method of claim 5, wherein, for a given processing device group for which the available bandwidth is updated, the updated available bandwidth is either:
a difference between the available bandwidth prior to the update and the required bandwidth for performing the first task; or
a measured amount of available bandwidth while the first task is being performed.

7. The method of claim 1, wherein the list including the first processing device group further indicates, for each available processing device group, an amount of additional power needed for allocating the first task to the available processing device group, and
> wherein the method further comprises designating an available processing group having a lowest amount of power needed as the first processing device group.

8. The method of claim 7, wherein updating the list including the first processing device group includes updating the amount of additional power needed for one or more processing device groups sharing at least one hardware component or mechanical component with the first processing device group.

9. The method of claim 8, wherein, for a given processing device group for which the amount of additional power needed is updated, the updated amount of additional power needed is determined based on predetermined power requirements for the shared at least one hardware component or mechanical component.

10. The method of claim 1, wherein the first request indicates each of a required host server bandwidth and a required peer-to-peer bandwidth for performing the first task,
> wherein the list including the first processing device group indicates each of an available host server bandwidth and an available peer-to-peer bandwidth for each available processing device group, and
> wherein assigning the first task to the first processing device group is further based on:
> > an available host server bandwidth of the first processing group being greater than or equal to the required host server bandwidth for performing the first task; and
> > an available peer-to-peer bandwidth of the first processing group being greater than or equal to the required peer-to-peer bandwidth for performing the first task.

11. A system comprising:
a data center comprising a plurality of host servers, each host server connected to a separate group of processing devices, wherein at least some processing devices are configured to communicate with one another via peer-to-peer connections, each host server including grouping data identifying subgroups of the plurality of processing devices, each identified subgroup being associated with a respective indication of availability, a respective indication of available bandwidth, and a respective indication of power required for activation in the grouping data;
memory for storing instructions; and
one or more processors coupled to the memory and configured to execute the stored instructions to:
> receive a first request to allocate a first task to the plurality of processing devices, the first request indicating a required bandwidth for performing the first task;
> accessing, by the one or more processors, one or more lists including the grouping data;
> assigning, by the one or more processors, the first task to a first subgroup having an available bandwidth greater than or equal to the required bandwidth for performing the first task; and
> updating, by the one or more processors, the list including the first subgroup to indicate that each of the first subgroup and any other subgroup sharing at least one processing device with the first subgroup is unavailable.

12. The system of claim 11, wherein the one or more processors are configured to execute the stored instructions to indicate that the first subgroup is allocated and that the any other subgroup sharing at least one processing device with the first subgroup is unavailable.

13. The system of claim 12, wherein the one or more processors are further configured to execute the stored instructions to:
> receive a second request to allocate a second task to one or more of the plurality of processing devices, the second request indicating a required bandwidth for performing the second task;
> access one or more lists including the updated list;
> assign the second task to a second subgroup having an available bandwidth greater than or equal to the required bandwidth for performing the second task, wherein the first subgroup and the second subgroup do not share any processing devices; and
> re-update the updated list to indicate that each of the second subgroup and any other subgroup sharing at least one processing device with the second subgroup is unavailable.

14. The system of claim 12, wherein the one or more processors are further configured to execute the stored instructions to:
> receive an indication that the first task is completed; and
> update the list including the first subgroup to indicate that the first subgroup is available, and that any other subgroup sharing at least one processing device with the first subgroup and not sharing a processing device with another allocated subgroup is available.

15. The system of claim 11, wherein the one or more processors are configured to execute the stored instructions to update the available bandwidth for one or more subgroups sharing at least one bus connection with the first subgroup.

16. The system of claim 15, wherein, for a given subgroup for which the available bandwidth is updated, the updated available bandwidth is either:
> a difference between the available bandwidth prior to the update and the required bandwidth for performing the first task; or
> a measured amount of available bandwidth while the first task is being performed.

17. The system of claim 11, wherein the list including the first subgroup further indicates, for each available subgroup, an amount of additional power needed for allocating the first task to the available subgroup, and
> wherein the one or more processors are further configured to execute the stored instructions to designating an available processing group having a lowest amount of power needed as the first subgroup.

18. The system of claim 17, wherein the one or more processors are configured to execute the stored instructions to update the amount of additional power needed for one or more subgroups sharing at least one hardware component or mechanical component with the first subgroup.

19. The system of claim 18, wherein, for a given subgroup for which the amount of additional power needed is updated, the one or more processors are configured to execute the stored instructions to determine the updated amount of additional power needed based on predetermined power requirements for the shared at least one hardware component or mechanical component.

20. The system of claim 11, wherein the first request indicates each of a required host server bandwidth and a required peer-to-peer bandwidth for performing the first task, wherein the list including the first subgroup indicates each of an available host server bandwidth and an available peer-to-peer bandwidth for each available subgroup, and wherein the one or more processors are configured to execute the stored instructions to assign the first task to the first subgroup further based on:
- an available host server bandwidth of the first processing group being greater than or equal to the required host server bandwidth for performing the first task; and
- an available peer-to-peer bandwidth of the first processing group being greater than or equal to the required peer-to-peer bandwidth for performing the first task.

* * * * *